(12) United States Patent
Niimi et al.

(10) Patent No.: US 11,628,824 B2
(45) Date of Patent: Apr. 18, 2023

(54) CONTROLLER FOR VEHICLE AND CONTROL METHOD FOR VEHICLE

(71) Applicant: TOYOTA JIDOSHA KABUSHIKI KAISHA, Toyota (JP)

(72) Inventors: Yoshitaka Niimi, Toyota (JP); Eiji Murase, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/360,802

(22) Filed: Jun. 28, 2021

(65) Prior Publication Data
US 2022/0017070 A1 Jan. 20, 2022

(30) Foreign Application Priority Data
Jul. 14, 2020 (JP) .............................. JP2020-120640

(51) Int. Cl.
*B60W 20/40* (2016.01)
*B60W 20/20* (2016.01)

(52) U.S. Cl.
CPC ............ *B60W 20/40* (2013.01); *B60W 20/20* (2013.01); *B60W 2510/0638* (2013.01); *B60W 2510/0657* (2013.01)

(58) Field of Classification Search
CPC ................. B60W 20/40; B60W 20/20; B60W 2510/0638; B60W 2510/0657
USPC ............................................................ 701/22
See application file for complete search history.

(56) References Cited

U.S. PATENT DOCUMENTS

| | | | |
|---|---|---|---|
| 2011/0192368 A1* | 8/2011 | Becker | F02M 35/1294 123/184.21 |
| 2019/0359201 A1* | 11/2019 | Komuro | B60W 20/13 |
| 2020/0346632 A1* | 11/2020 | Gruner | B60W 10/06 |

FOREIGN PATENT DOCUMENTS

| | | | | |
|---|---|---|---|---|
| JP | 2008-144859 A | 6/2008 | | |
| JP | 2011-133070 A | 7/2011 | | |
| JP | 2012-091584 A | 5/2012 | | |
| JP | WO-2016051605 A1 * | 4/2016 | ............... | B60K 6/54 |
| JP | 2019-202650 A | 11/2019 | | |

* cited by examiner

*Primary Examiner* — Yi-Kai Wang
(74) *Attorney, Agent, or Firm* — Oliff PLC

(57) ABSTRACT

A controller for a vehicle includes a controlling unit. In a case in which the target engine torque is less than or equal to a threshold, the controlling unit controls the engine such that the torque of the engine becomes equal to the target engine torque, and controls a motor-generator such that the torque of the motor-generator becomes equal to the target motor torque. Also, in a case in which the target engine torque is greater than the threshold, the controlling unit controls the engine such that the torque of the engine becomes less than or equal to the threshold, and controls the motor-generator such that the torque of the motor-generator increases.

8 Claims, 3 Drawing Sheets

CONTROLLER FOR VEHICLE AND CONTROL METHOD FOR VEHICLE

BACKGROUND

1. Field

The present disclosure relates to a controller for a vehicle and a control method for a vehicle.

2. Description of Related Art

Japanese Laid-Open Patent Publication No. 2019-202650 discloses a controller for a vehicle. The vehicle is equipped with an engine and a motor-generator as drive sources. The vehicle is also equipped with a battery that supplies power to the motor-generator.

The controller for the vehicle executes control for suppressing "booming noise," which is perceived in the passenger compartment due to vibrations of the engine and vibrations of the power transmission system, which includes components from the engine to the driven wheels. Booming noise increases as the torque of the engine increases. Thus, in order to suppress booming noise, the controller for the vehicle controls the engine to reduce the torque of the engine. At the same time, the controller for the vehicle controls the motor-generator to increase the torque of the motor-generator.

As the torque of the motor-generator increases, the power supplied to the motor-generator from the battery increases. As a result, the state of charge of the battery may be excessively reduced. Thus, it is desired to maintain the state of charge of the battery, while suppressing booming noise.

SUMMARY

In a first general aspect, a controller for a vehicle is provided. The vehicle includes an engine as a drive source, a motor-generator as a drive source, and a battery that supplies power to the motor-generator. The controller includes a target engine torque calculating unit, a target motor torque calculating unit, a permissible value calculating unit, a threshold calculating unit, and a controlling unit. The target engine torque calculating unit calculates a target engine torque based on an accelerator operated amount. The target engine torque is a target value of a torque of the engine. The target motor torque calculating unit calculates a target motor torque based on the accelerator operated amount. The target motor torque is a target value of a torque of the motor-generator. The permissible value calculating unit calculates a booming noise permissible value based on an index value indicating a traveling state of the vehicle. The booming noise permissible value is an upper limit of a booming noise. The threshold calculating unit calculates a threshold. The threshold is an upper limit of the torque of the engine used to limit the booming noise to the booming noise permissible value or less. In a case in which the target engine torque is less than or equal to the threshold, the controlling unit controls the engine such that the torque of the engine becomes equal to the target engine torque, and controls the motor-generator such that the torque of the motor-generator becomes equal to the target motor torque. In a case in which the target engine torque is greater than the threshold, the controlling unit controls the engine such that the torque of the engine becomes less than or equal to the threshold, and controls the motor-generator such that the torque of the motor-generator becomes greater than the target motor torque.

In a second general aspect, a controller for a vehicle is provided. The vehicle includes an engine as a drive source, a motor-generator as a drive source, and a battery that supplies power to the motor-generator. The controller includes circuitry, which includes a target engine torque calculating unit, a target motor torque calculating unit, a permissible value calculating unit, a threshold calculating unit, and a controlling unit. The target engine torque calculating unit calculates a target engine torque based on an accelerator operated amount. The target engine torque is a target value of a torque of the engine. The target motor torque calculating unit calculates a target motor torque based on the accelerator operated amount. The target motor torque is a target value of a torque of the motor-generator. The permissible value calculating unit calculates a booming noise permissible value based on an index value indicating a traveling state of the vehicle. The booming noise permissible value is an upper limit of a booming noise. The threshold calculating unit calculates a threshold. The threshold is an upper limit of the torque of the engine used to limit the booming noise to the booming noise permissible value or less. In a case in which the target engine torque is less than or equal to the threshold, the controlling unit controls the engine such that the torque of the engine becomes equal to the target engine torque, and controls the motor-generator such that the torque of the motor-generator becomes equal to the target motor torque. In a case in which the target engine torque is greater than the threshold, the controlling unit controls the engine such that the torque of the engine becomes less than or equal to the threshold, and controls the motor-generator such that the torque of the motor-generator becomes greater than the target motor torque.

In a third general aspect, a control method for a vehicle is provided. The vehicle includes an engine as a drive source, a motor-generator as a drive source, and a battery that supplies power to the motor-generator. The control method includes: calculating a target engine torque based on an accelerator operated amount, the target engine torque being a target value of a torque of the engine; calculating a target motor torque based on the accelerator operated amount, the target motor torque being a target value of a torque of the motor-generator; calculating a booming noise permissible value based on an index value indicating a traveling state of the vehicle, the booming noise permissible value being an upper limit of a booming noise; calculating a threshold, the threshold being an upper limit of the torque of the engine used to limit the booming noise to the booming noise permissible value or less; in a case in which the target engine torque is less than or equal to the threshold, controlling the engine such that the torque of the engine becomes equal to the target engine torque, and controlling the motor-generator such that the torque of the motor-generator becomes equal to the target motor torque; and in a case in which the target engine torque is greater than the threshold, controlling the engine such that the torque of the engine becomes less than or equal to the threshold, and controlling the motor-generator such that the torque of the motor-generator becomes greater than the target motor torque.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 200 for a vehicle 100 according to one embodiment will now be described with reference to FIGS. 1 to 4. First, the configuration of the vehicle 100 will be described.

Figure 1:
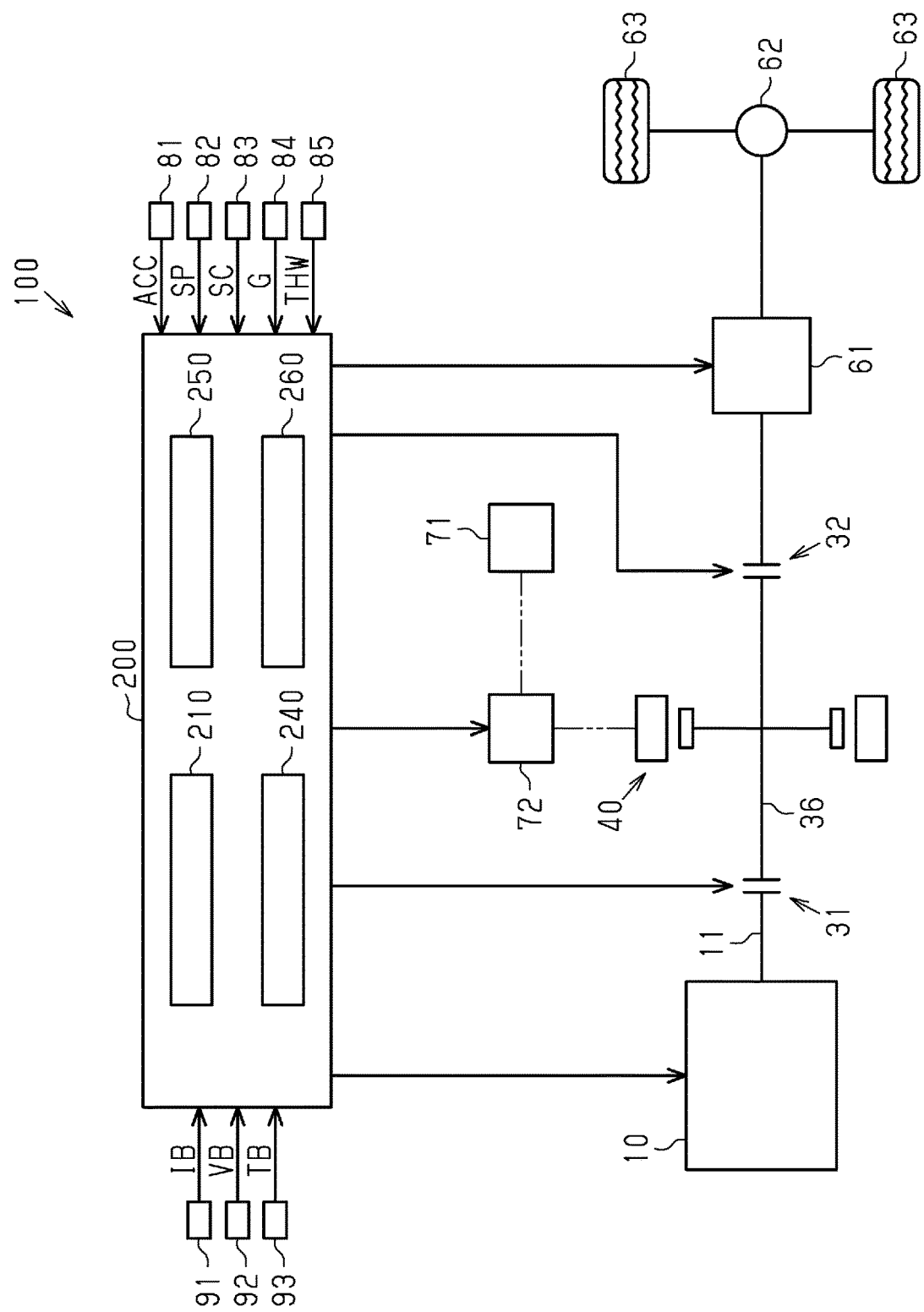
FIG. 1 is a diagram showing the configuration of a vehicle.

As shown in FIG. 1, the vehicle 100 includes a spark-ignition type engine 10. The vehicle 100 includes a motor-generator 40, which functions as both an electric motor and a generator. The vehicle 100 is a hybrid vehicle, which includes the engine 10 and the motor-generator 40 as drive sources.

The engine 10 includes a crankshaft 11. The crankshaft 11 is coupled to pistons accommodated in cylinders (not shown). The crankshaft 11 is rotated by combustion of a mixture of fuel and intake air in the cylinders.

The vehicle 100 includes a battery 71 an inverter 72. When the motor-generator 40 functions as a generator, the battery 71 stores power generated by the motor-generator 40. When the motor-generator 40 functions as an electric motor, the battery 71 supplies power to the motor-generator 40. The inverter 72 regulates the amount of power transferred between the motor-generator 40 and the battery 71.

The vehicle 100 includes a first clutch 31, a second clutch 32, a coupling shaft 36, an automatic transmission 61, a differential mechanism 62, and driven wheels 63. The crankshaft 11 is connected to the coupling shaft 36 through the first clutch 31. Hydraulic pressure that is supplied to the interior of the first clutch 31 selectively switches the state of the first clutch 31 between an engaged state and a disengaged state. The motor-generator 40 is connected to the coupling shaft 36.

The coupling shaft 36 is connected to the automatic transmission 61 through the second clutch 32. Hydraulic pressure that is supplied to the interior of the second clutch 32 selectively switches the state of the second clutch 32 between an engaged state and a disengaged state. The automatic transmission 61 is a multi-speed type that has multiple planetary gear mechanisms and discretely changes the gear ratio. The automatic transmission 61 changes the gear position, thereby switching the gear ratio. The automatic transmission 61 is connected to the driven wheels 63 through the differential mechanism 62.

The vehicle 100 includes an accelerator position sensor 81, a vehicle speed sensor 82, a crank angle sensor 83, an acceleration sensor 84, a coolant temperature sensor 85, a current sensor 91, a voltage sensor 92, and a temperature sensor 93.

The accelerator position sensor 81 detects an accelerator operated amount ACC, which is the operated amount (e.g. depression amount) of the accelerator pedal by the driver. The vehicle speed sensor 82 detects a vehicle speed SP, which is the speed of the vehicle 100. The crank angle sensor 83 detects a crank angle SC, which is a rotational angle of the crankshaft 11. The acceleration sensor 84 detects acceleration G of the vehicle 100. The coolant temperature sensor 85 detects a coolant temperature THW, which is the temperature of coolant flowing through various parts of the engine 10. The current sensor 91 detects a current IB, which is delivered to or from the battery 71. The voltage sensor 92 detects a voltage VB, which is the terminal-to-terminal voltage of the battery 71. The temperature sensor 93 detects a battery temperature TB, which is the temperature of the battery 71.

The vehicle 100 includes the controller 200. The controller 200 receives signals indicating the accelerator operated amount ACC, the vehicle speed SP, the crank angle SC, the acceleration G, the coolant temperature THW, the current IB, the voltage VB, and the battery temperature TB from the accelerator position sensor 81, the vehicle speed sensor 82, the crank angle sensor 83, the acceleration sensor 84, the coolant temperature sensor 85, the current sensor 91, the voltage sensor 92, and the temperature sensor 93, respectively.

The controller 200 calculates an engine rotation speed NE, which is the number of revolutions per unit time of the crankshaft 11, based on the crank angle SC. The controller 200 calculates the state of charge SOC of the battery 71 based on the current IB, the voltage VB, and the battery temperature TB.

The controller 200 includes a target torque calculating unit 210, a permissible value calculating unit 240, a threshold calculating unit 250, and a controlling unit 260.

Based on the accelerator operated amount ACC and the vehicle speed SP, the target torque calculating unit 210 calculates a target vehicle output, which is a target value of the output necessary for the vehicle 100 to travel. Based on the target vehicle output, the target torque calculating unit 210 calculates a target vehicle torque TA, which is a target value of the total torque of the vehicle 100. Based on the target vehicle torque TA and the state of charge SOC, the target torque calculating unit 210 determines the torque proportion of the engine 10 and the motor-generator 40. Based on the target vehicle torque TA and the torque proportion, the target torque calculating unit 210 calculates a target engine torque TE, which is a target value of the torque of the engine 10. The torque of the engine 10 is torque that is delivered to the first clutch 31 from the crankshaft 11. Based on the target vehicle torque TA and the torque proportion, the target torque calculating unit 210 calculates a target motor torque TM, which is a target value of the torque of the motor-generator 40. The torque of the motor-generator 40 refers to torque that is delivered to the coupling shaft 36 from the motor-generator 40. In the present embodiment, the target torque calculating unit 210 functions as a target engine torque calculating unit and a target motor torque calculating unit.

The controlling unit 260 controls the engine 10 based on the target engine torque TE. Specifically, the controlling unit 260 controls the torque of the engine 10 by regulating the amount of fuel and intake air supplied to the cylinders of the engine 10. The controlling unit 260 controls the motor-generator 40 based on the target motor torque TM. Specifically, the controlling unit 260 controls the torque of the motor-generator 40 by regulating the amount of power transferred between the motor-generator 40 and the battery 71 through the inverter 72.

The controlling unit 260 outputs a control signal to the first clutch 31 to control the state of the first clutch 31. The controlling unit 260 outputs a control signal to the second clutch 32 to control the state of the second clutch 32. The controlling unit 260 outputs a control signal to the automatic transmission 61 to perform the shift control of the automatic transmission 61.

The permissible value calculating unit 240 calculates a booming noise permissible value Y, which is an upper limit of booming noise, based on the vehicle speed SP and the acceleration G. The upper limit of booming noise is a permissible value that is determined during the design phase to prevent booming noise from being perceived by occupants such as the driver of the vehicle 100. In the present embodiment, the vehicle speed SP and the acceleration G are index values that indicate the traveling state of the vehicle 100. The threshold calculating unit 250 calculates a threshold Z based on the booming noise permissible value Y. The threshold Z is an upper limit of the torque of the engine 10 used to limit booming noise to the booming noise permissible value Y or less.

The controller 200 may include circuitry including one or more processors that perform various processes according to computer programs (software). The controller 200 may be circuitry including one or more dedicated hardware circuits such as application specific integrated circuits (ASIC) that execute at least part of various processes, or a combination thereof. The processor includes a CPU and a memory such as a RAM and a ROM. The memory stores program codes or instructions configured to cause the CPU to execute processes. The memory, which is a computer-readable medium, includes any type of media that are accessible by general-purpose computers and dedicated computers.

Next, the torque control of the engine 10 and the motor-generator 40 executed by the controller 200 will be described. The controller 200 repeatedly executes the torque control from when the start switch of the vehicle 100 is manipulated such that the controller 200 starts operating until when the start switch is manipulated such that the controller 200 stops operating.

Figure 2:
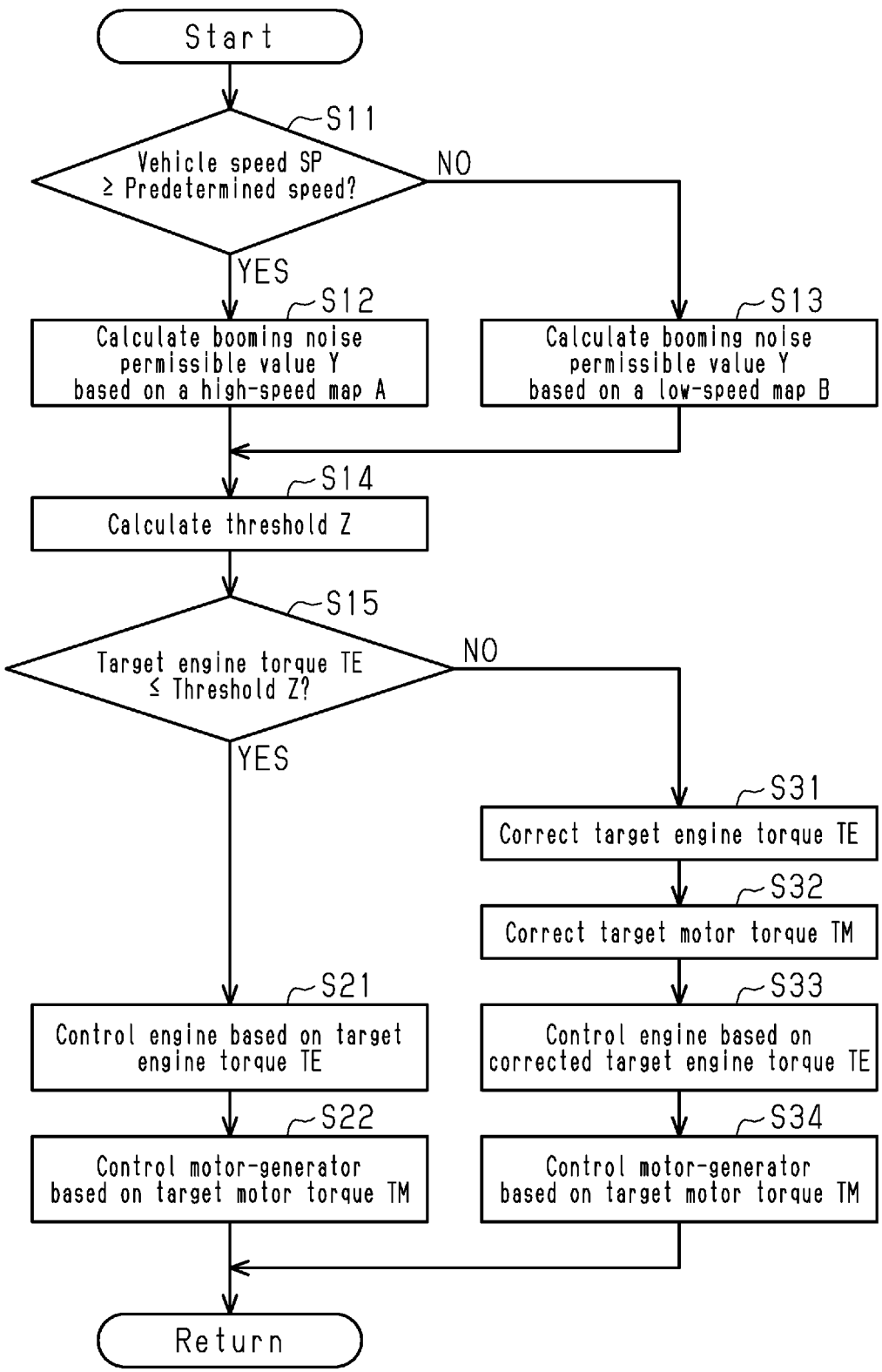
FIG. 2 is a flowchart showing torque control executed by a controller.
Figure 3:
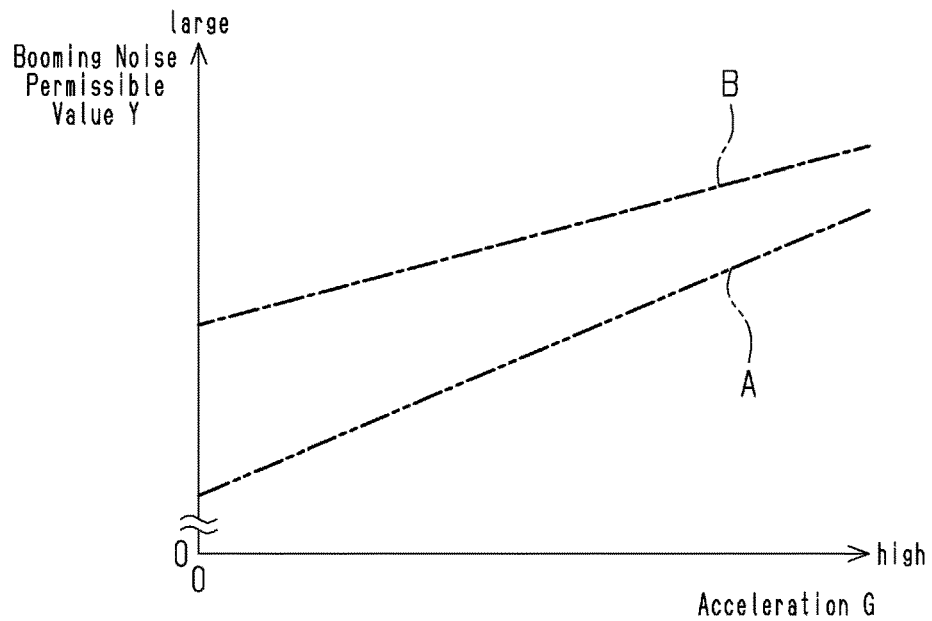
FIG. 3 is a diagram showing the relationship among acceleration of a vehicle, speed of the vehicle, and a booming noise permissible value.

As shown in FIG. 2, when the torque control is started, the permissible value calculating unit 240 determines, in step S11, whether the vehicle speed SP is greater than or equal to a predetermined speed. The predetermined speed is, for example, a 50 km/h. When determining in step S11 that the vehicle speed SP is greater than or equal to the predetermined speed (S11: YES), the permissible value calculating unit 240 advances the process to step S12.

In step S12, the permissible value calculating unit 240 calculates the booming noise permissible value Y corresponding to the acceleration G, based on the acceleration G and a high-speed map A. As indicated by the long-dash double-short-dash line in FIG. 3, the high-speed map A associates the acceleration G with the booming noise permissible value Y and is stored in the permissible value calculating unit 240. As the acceleration G increases, the booming noise permissible value Y that is calculated using the high-speed map A increases. Thereafter, the permissible value calculating unit 240 advances the process to step S14.

On the other hand, when the vehicle speed SP is less than the predetermined speed in step S11 (S11: NO), the permissible value calculating unit 240 advances the process to step S13, as shown in FIG. 2.

In step S13, the permissible value calculating unit 240 calculates the booming noise permissible value Y corresponding to the acceleration G, based on the acceleration G and a low-speed map B. As indicated by the long-dash short-dash line in FIG. 3, the low-speed map B associates the acceleration G with the booming noise permissible value Y and is stored in the permissible value calculating unit 240. As the acceleration G increases, the booming noise permissible value Y that is calculated using the low-speed map B increases. For the same acceleration G, the booming noise permissible value Y that is calculated using the low-speed map B is greater than the booming noise permissible value Y that is calculated using the high-speed map A. The amount of change in the booming noise permissible value Y in relation to the acceleration G is smaller when the booming noise permissible value Y is calculated using the low-speed map B than when the booming noise permissible value Y is calculated using the high-speed map A. Thereafter, the permissible value calculating unit 240 advances the process to step S14.

Figure 4:
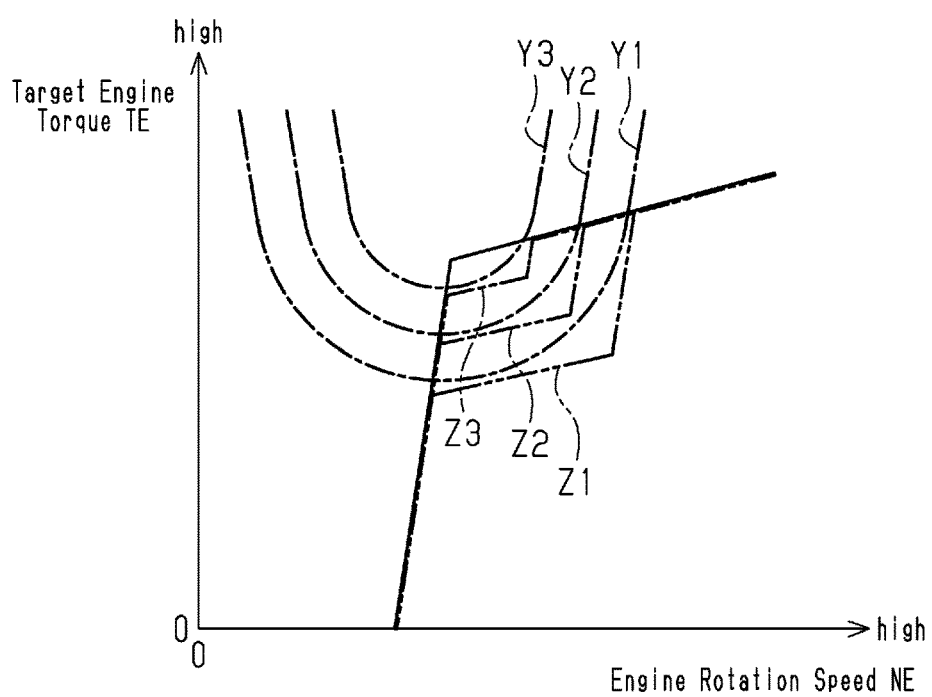
FIG. 4 is a diagram showing the relationship among rotation speed of an engine, torque of the engine, the level of booming noise, and values of a threshold.

In step S14 shown in FIG. 2, the threshold calculating unit 250 calculates the threshold Z corresponding to the booming noise permissible value Y based on the booming noise permissible value Y and a threshold setting map C. FIG. 4 shows the relationship among the level of the booming noise, the target engine torque TE, and the engine rotation speed NE. The level of the booming noise is represented by a value Y1, a value Y2, and a value Y3 in ascending order. As shown in FIG. 4, the booming noise increases as the target engine torque TE increases. In order to suppress the booming noise, the threshold Z needs to be reduced to reduce the target engine torque TE as the booming noise permissible value Y decreases. As shown in FIG. 4, the threshold setting map C associates the booming noise permissible value Y with the threshold Z, and is stored in the threshold calculating unit 250. As the booming noise permissible value Y is reduced, the threshold Z, which is set in advance in the threshold setting map C, is reduced. For example, when the booming noise permissible value Y is the value Y1, the threshold calculating unit 250 calculates a value Z1 as the threshold Z using the threshold setting map C. The value of the threshold Z is represented by a value Z1, a value Z2, and a value Z3 in ascending order. Thereafter, the threshold calculating unit 250 advances the process to step S15.

As shown in FIG. 2, the controlling unit 260 determines whether the target engine torque TE is less than or equal to the threshold Z in step S15. If the target engine torque TE is less than or equal to the threshold Z (S15: YES), the controlling unit 260 advances the process to step S21.

In step S21, the controlling unit 260 controls the engine 10 such that the torque of the engine 10 becomes equal to the target engine torque TE. Thereafter, the controlling unit 260 advances the process to step S22. In step S22, the controlling unit 260 controls the motor-generator 40 such that the torque of the motor-generator 40 becomes equal to the target motor torque TM. Thereafter, the controlling unit 260 ends the current torque control.

If the target engine torque TE is greater than the threshold Z (S15: NO), the controlling unit 260 advances the process to step S31.

In step S31, the controlling unit 260 corrects the target engine torque TE such that the target engine torque TE decreases. Specifically, the controlling unit 260 corrects the target engine torque TE such that the corrected target engine torque TE is equal to the threshold Z. Thereafter, the controlling unit 260 advances the process to step S32.

In step S32, the controlling unit 260 corrects the target motor torque TM such that the target motor torque TM increases. Specifically, the controlling unit 260 corrects the target motor torque TM such that the target motor torque TM increases, after being corrected, by a correction amount of the target engine torque TE in step S31, that is, by a value obtained by subtracting the threshold Z from the target engine torque TE, which has not been corrected.

The corrected target motor torque TM is represented by the following expression (1).

$$TM2 = TM1 + TE1 - Z \tag{1}$$

TM1 represents the value of the target motor torque TM, which has not been corrected. TM2 represents the value of the target motor torque TM after being corrected. TE1 represents the value of the target engine torque TE, which has not been corrected. Thereafter, the controlling unit 260 advances the process to step S33.

In step S33, the controlling unit 260 controls the engine 10 such that the torque of the engine 10 becomes equal to the corrected target engine torque TE, which has been calculated in step S31. Thereafter, the controlling unit 260 advances the process to step S34. In step S34, the controlling unit 260 controls the motor-generator 40 such that the torque of the motor-generator 40 becomes equal to the corrected target motor torque TM, which has been calculated in step S32. Thereafter, the controlling unit 260 ends the current torque control.

An operation and advantages of the present embodiment will now be described.

The threshold Z is calculated as the upper limit of the torque of the engine 10 used to limit the booming noise to the booming noise permissible value Y or less. Thus, when the target engine torque TE is less than or equal to the threshold Z, the target engine torque TE does not need to be reduced in order to suppress the booming noise. Accordingly, the target motor torque TM does not need to be increased in this case. In this respect, the present embodiment controls the engine 10 and the motor-generator 40 based on the initial values of the target engine torque TE and the target motor torque TM in a case in which the target engine torque TE is less than or equal to the threshold Z. This prevents the actual torque of the motor-generator 40 from exceeding the initial target motor torque TM, and thus limits the power supplied from the battery 71 to the motor-generator 40. This limits the decrease in the state of charge SOC.

On the other hand, when the target engine torque TE is greater than the threshold Z, the actual booming noise may exceed the booming noise permissible value Y. In this respect, when the target engine torque TE is greater than the threshold Z, the present embodiment corrects the target engine torque TE such that the target engine torque TE decreases and corrects the target motor torque TM such that the target motor torque TM increases. The engine 10 and the motor-generator 40 are controlled based on the corrected target engine torque TE and the corrected target motor torque TM. This limits the torque of the engine 10 to a value less than or equal to the threshold Z, and thus limits the booming noise to the booming noise permissible value Y or less. As a result, the present embodiment maintains the state of charge SOC, while suppressing the booming noise.

Other operations and advantages of the present embodiment will now be described.

(1) As the acceleration G increases, the traveling noise, which is generated as the vehicle 100 travels, increases. Thus, the driver is less likely to perceive the booming noise when the acceleration G is high than when the acceleration G is low. Therefore, when the acceleration G is high, there is a little need for a decrease in the target engine torque TE or for an increase in the target motor torque TM, in order to suppress booming noise. In this respect, the present embodiment increases the booming noise permissible value Y and the threshold Z as the acceleration G increases. Thus, as compared to a case in which the booming noise permissible value Y for a low value of the acceleration G is maintained, the target engine torque TE is less frequently determined to be greater than the threshold Z. Also, when the target engine torque TE is determined to be greater than the threshold Z, the correction amount of the target motor torque TM is relatively small. This suppresses the torque of the motor-generator 40, and thus suppresses the power supplied to the motor-generator 40 from the battery 71. As a result, the decrease in the state of charge SOC is limited.

(2) In general, the acceleration G is more likely to change due to acceleration or deceleration, or right or left turning of the vehicle 100, when the vehicle speed SP is low than when the vehicle speed SP is high. If relatively loud traveling noise is frequently generated due to changes in the acceleration G, the driver perceives booming noise less frequently. In this respect, in anticipation of less frequent perception of booming noise by the driver of the vehicle 100, the present embodiment increases the booming noise permissible value Y when the vehicle speed SP is less than the predetermined speed. Since the booming noise permissible value Y increases, the threshold Z increases, accordingly. This prevents the torque of the motor-generator 40 from increasing excessively.

The present embodiment may be modified as follows. The present embodiment and the following modifications can be combined as long as the combined modifications remain technically consistent with each other.

The process for calculating the target engine torque TE and the target motor torque TM can be changed. For example, the target torque calculating unit 210 may first calculate the target engine torque TE based on the target vehicle torque TA, and set the target motor torque TM to a value obtained by subtracting the target engine torque TE from the target vehicle torque TA. Likewise, the target torque calculating unit 210 may first calculate the target motor torque TM based on the target vehicle torque TA, and set the target engine torque TE to a value obtained by subtracting the target motor target motor torque TM from the target vehicle torque TA.

The process for calculating the booming noise permissible value Y can be changed. For example, the predetermined speed used to select the high-speed map A and the low-speed map B does not necessarily need to be 50 km/h.

Instead of selecting the high-speed map A or the low-speed map B, the booming noise permissible value Y may be calculated in accordance with the vehicle speed SP. Specifically, the booming noise permissible value Y, which is calculated by the permissible value calculating unit 240, may be increased as the vehicle speed SP decreases.

For example, the booming noise permissible value Y, which is calculated by the permissible value calculating unit 240, does not necessarily need to be increased as the acceleration G increases. The booming noise permissible value Y may be increased discretely. Specifically, the booming noise permissible value Y that is calculated when the acceleration G is greater than or equal to a predetermined acceleration may be greater than that when the acceleration G is less than the predetermined acceleration.

For example, the permissible value calculating unit 240 may use only one of the vehicle speed SP or the acceleration G as the index value that indicates the traveling state of the vehicle 100.

The process for correcting the target engine torque TE can be changed. For example, in step S31, the controlling unit 260 may correct the target engine torque TE by subtracting a predetermined value from the target engine torque TE. Even this configuration is capable of equalizing the corrected target engine torque TE with the threshold Z, and causing the corrected target engine torque TE to be less than the threshold Z.

The process for correcting the target motor torque TM can be changed. For example, in a case in which the target engine torque TE is corrected in step S31 such that the corrected target engine torque TE is less than the threshold Z, the correction amount of the target motor torque TM in step S32 simply needs to be equalized with the correction amount of the target engine torque TE in step S31. That is, the target vehicle torque TA is preferably constant even in a case in which the process for correcting the target engine torque TE or the process for correcting the target motor torque TM is changed.

The correction amount of the target motor torque TM in step S32 may be greater than or less than the correction amount of the target engine torque TE in step S31. That is, the target vehicle torque TA is prevented from being reduced due to a decrease in the target engine torque TE as long as the corrected target motor torque TM, which is calculated by the controlling unit 260, is greater than the target motor torque TM, which has not been corrected.

The process for calculating the threshold Z can be changed. In the vehicle 100, the exhaust characteristics are more likely to deteriorate, for example, due to an increase in unburned fuel in the exhaust gas discharged from the cylinders of the engine 10, when the temperature of the engine 10 is low than when the temperature of the engine 10 is high. In this regard, the threshold Z, which is calculated by the threshold calculating unit 250, may be lower when the temperature of the engine 10 is low than when the temperature of the engine 10 is high. This configuration reduces the torque of the engine 10 when the exhaust characteristics are likely to deteriorate, thereby preventing the exhaust characteristics from deteriorating. The temperature of the engine 10 can be determined using, for example, the coolant temperature THW.

The vehicle 100 may be equipped two or more motor-generators. That is, the technique of the present disclosure may be used for any vehicle that is equipped with one or more engines and one or more motor-generators.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, wherein the vehicle includes: an engine as a drive source; a motor-generator as a drive source; and a battery that supplies power to the motor-generator, the controller comprising:
    circuitry configured to:
        calculate a target engine torque based on an accelerator operated amount, the target engine torque being a target value of a torque of the engine;
        calculate a target motor torque based on the accelerator operated amount, the target motor torque being a target value of a torque of the motor-generator;
        calculate a booming noise permissible value based on an index value indicating a traveling state of the vehicle, the booming noise permissible value being an upper limit of a booming noise, the index value including a speed of the vehicle;
        calculate a threshold, the threshold being an upper limit of the torque of the engine used to limit the booming noise to the booming noise permissible value or less;
        in a case in which the target engine torque is less than or equal to the threshold, control the engine such that the torque of the engine becomes equal to the target engine torque, and control the motor-generator such that the torque of the motor-generator becomes equal to the target motor torque;
        in a case in which the target engine torque is greater than the threshold, control the engine such that the torque of the engine becomes less than or equal to the threshold, and control the motor-generator such that the torque of the motor-generator becomes greater than the target motor torque; and
        cause the booming noise permissible value to be greater in a case in which the speed of the vehicle is low than in a case in which the speed of the vehicle is high.

2. The controller for a vehicle according to claim 1, wherein
    the index value includes an acceleration of the vehicle, and
    the circuitry is configured to cause the booming noise permissible value to be greater in a case in which the acceleration is high than in a case in which the acceleration is low.

3. The controller for a vehicle according to claim 1, wherein
    the circuitry is configured to cause the threshold to be less in a case in which a temperature of the engine is low than in a case in which the temperature of the engine is high.

4. A control method for a vehicle, wherein the vehicle includes: an engine as a drive source; a motor-generator as a drive source; and a battery that supplies power to the motor-generator, the control method comprising:
    calculating a target engine torque based on an accelerator operated amount, the target engine torque being a target value of a torque of the engine;
    calculating a target motor torque based on the accelerator operated amount, the target motor torque being a target value of a torque of the motor-generator;

calculating a booming noise permissible value based on an index value indicating a traveling state of the vehicle, the booming noise permissible value being an upper limit of a booming noise, the index value including a speed of the vehicle;

calculating a threshold, the threshold being an upper limit of the torque of the engine used to limit the booming noise to the booming noise permissible value or less;

in a case in which the target engine torque is less than or equal to the threshold, controlling the engine such that the torque of the engine becomes equal to the target engine torque, and controlling the motor-generator such that the torque of the motor-generator becomes equal to the target motor torque;

in a case in which the target engine torque is greater than the threshold, controlling the engine such that the torque of the engine becomes less than or equal to the threshold, and controlling the motor-generator such that the torque of the motor-generator becomes greater than the target motor torque; and causing the booming noise permissible value to be greater in a case in which the speed is low than in a case in which the speed is high.

5. The controller for a vehicle according to claim 1, wherein the index value further includes an acceleration of the vehicle, the circuitry is configured to when the speed of the vehicle is greater than or equal to a predetermined speed, calculate the booming noise permissible value corresponding to the acceleration of the vehicle based on a high-speed map that sets the booming noise permissible value to be greater in a case in which the acceleration is high than in a case in which the acceleration is low, and when the speed of the vehicle is less than the predetermined speed, calculate the booming noise permissible value corresponding to the acceleration of the vehicle based on a low-speed map that sets the booming noise permissible value to be greater in a case in which the acceleration is high than in a case in which the acceleration is low, and for the same acceleration, the booming noise permissible value that is calculated using the low-speed map is greater than the booming noise permissible value that is calculated using the high-speed map.

6. The controller for a vehicle according to claim 5, wherein an amount of change in the booming noise permissible value in relation to the acceleration is smaller when the booming noise permissible value is calculated using the low-speed map than when the booming noise permissible value is calculated using the high-speed map.

7. The control method according to claim 4, wherein the index value further includes an acceleration of the vehicle, calculating the booming noise permissible value includes when the speed of the vehicle is greater than or equal to a predetermined speed, calculating the booming noise permissible value corresponding to the acceleration of the vehicle based on a high-speed map that sets the booming noise permissible value to be greater in a case in which the acceleration is high than in a case in which the acceleration is low, and when the speed of the vehicle is less than the predetermined speed, calculating the booming noise permissible value corresponding to the acceleration of the vehicle based on a low-speed map that sets the booming noise permissible value to be greater in a case in which the acceleration is high than in a case in which the acceleration is low, and for the same acceleration, the booming noise permissible value that is calculated using the low-speed map is greater than the booming noise permissible value that is calculated using the high-speed map.

8. The control method according to claim 7, wherein an amount of change in the booming noise permissible value in relation to the acceleration is smaller when the booming noise permissible value is calculated using the low-speed map than when the booming noise permissible value is calculated using the high-speed map.

* * * * *